(12) United States Patent
Hechtle et al.

(10) Patent No.: US 11,571,760 B2
(45) Date of Patent: Feb. 7, 2023

(54) TOOL FOR CHIPLESS PRODUCTION OR FINISHING OF A THREAD, METHOD FOR PRODUCING THE TOOL AND METHOD FOR PRODUCING A THREAD

(71) Applicant: EMUGE-Werk Richard Glimpel GmbH & Co. KG, Fabrik für Präzisionswerkzeuge, Lauf a. d. Pegnitz (DE)

(72) Inventors: Dietmar Hechtle, Pegnitz (DE); Marko Übler, Lauf (DE); Jürgen Fenzel, Simmelsdorf (DE)

(73) Assignee: EMUGE-WERK RICHARD GLIMPEL GMBH & CO. KG, FABRIK FÜR PRÄZISIONSWERKZEUGE, Lauf A. D. Pegnitz (DE)

( * ) Notice: Subject to any disclaimer, the term of this patent is extended or adjusted under 35 U.S.C. 154(b) by 65 days.

(21) Appl. No.: 17/089,471

(22) Filed: Nov. 4, 2020

(65) Prior Publication Data
US 2021/0138567 A1    May 13, 2021

(30) Foreign Application Priority Data

Nov. 7, 2019   (DE) .......................... 102019130009.6

(51) Int. Cl.
*B23G 7/02* (2006.01)
*B23G 1/04* (2006.01)
*B23G 5/06* (2006.01)

(52) U.S. Cl.
CPC ............. *B23G 7/02* (2013.01); *B23G 1/04* (2013.01); *B23G 5/06* (2013.01)

(58) Field of Classification Search
CPC ... B23G 1/04; B23G 1/26; B23G 3/08; B23G 5/06; B23G 7/00; B23G 7/02; F16H 2025/2481; F16H 2025/2242
See application file for complete search history.

(56) References Cited

U.S. PATENT DOCUMENTS 3,328,814 A * 7/1967 Beaumonte ............... B23G 5/06
                                                        470/198
5,993,120 A * 11/1999 Giessler ................. B23G 5/005
                                                        408/59

(Continued)

FOREIGN PATENT DOCUMENTS

DE    19947001      4/2000
DE    10246871      5/2004

(Continued)

*Primary Examiner* — Edward T Tolan
(74) *Attorney, Agent, or Firm* — Workman Nydegger

(57) ABSTRACT

A tool for the chipless production of a thread in a workpiece comprises at least one shaping region which can be rotated about a tool axis (A) for the chipless production or finishing of the thread. The shaping region comprises a plurality of pressing lobes projecting radially outwardly from the tool axis (A) for producing the thread by pressing the pressing lobes into the workpiece surface. The pressing lobes are successively arranged along a forming curve which substantially spirals around the tool axis (A), and the pitch of the forming curve essentially corresponds to the pitch of the thread to be produced or reworked. The forming curve has a helix angle (a), and a profile of at least one pressing lobe is designed in such a way that a thread produced in an axial section containing the tool axis is at least in sections round-arched or ogival.

18 Claims, 4 Drawing Sheets

(56) References Cited

U.S. PATENT DOCUMENTS

| | | | | |
|---|---|---|---|---|
| 6,217,267 B1* | 4/2001 | Sugano | ............... | B23G 7/02 |
| | | | | 470/204 |
| 6,334,370 B1* | 1/2002 | Sonoda | ............... | B21H 3/08 |
| | | | | 470/25 |
| 8,998,734 B2* | 4/2015 | Norimatsu | ............ | B23G 7/02 |
| | | | | 470/204 |
| 9,682,435 B2* | 6/2017 | Yan | ............... | B23G 5/005 |
| 2011/0020087 A1* | 1/2011 | Yamamoto | ............ | B23G 7/02 |
| | | | | 470/198 |
| 2012/0301236 A1* | 11/2012 | Ohhashi | ............... | B23G 5/20 |
| | | | | 408/22 |
| 2015/0158102 A1* | 6/2015 | Harada | ............... | B23G 5/06 |
| | | | | 470/198 |
| 2017/0239740 A1* | 8/2017 | Rosenvinge | ............ | B22F 5/106 |
| 2021/0023637 A1* | 1/2021 | Harada | ............... | B23G 7/02 |

FOREIGN PATENT DOCUMENTS

| | | |
|---|---|---|
| DE | 102006027611 | 12/2007 |
| DE | 102012100734 | 8/2013 |
| DE | 102013015237 | 3/2015 |
| DE | 102017103954 | 8/2018 |

* cited by examiner

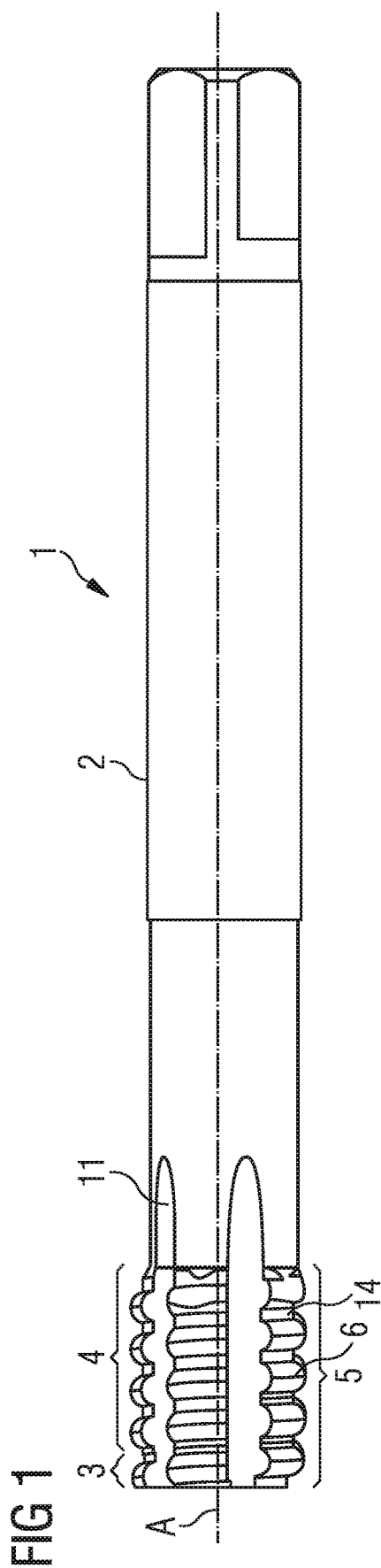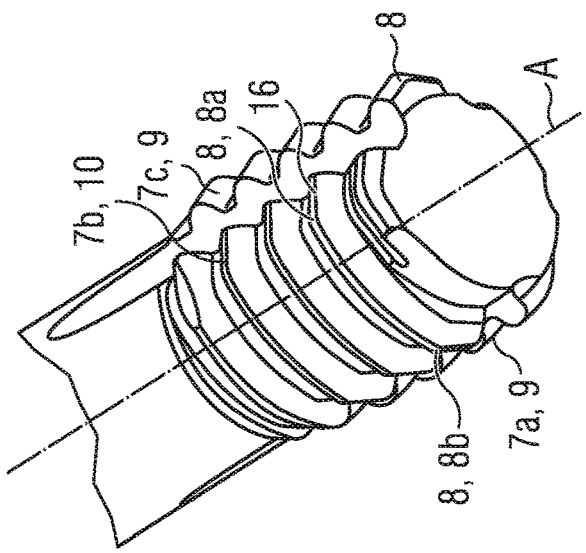

TOOL FOR CHIPLESS PRODUCTION OR FINISHING OF A THREAD, METHOD FOR PRODUCING THE TOOL AND METHOD FOR PRODUCING A THREAD

CROSS-REFERENCE TO RELATED APPLICATIONS

The present invention claims the benefit of priority to German Patent Application No. DE 10 2019 130 009.6, filed Nov. 7, 2019, the entire content of which is incorporated herein by reference.

BACKGROUND OF THE INVENTION

1. The Field of the Invention

The invention relates to a tool for chipless production or reworking of a thread, a method for producing the tool and a method for producing a thread.

2. Background and Relevant Art

A ball screw drive is a screw drive with balls inserted between the screw and nut. When turning between screw and nut, the balls roll in a corresponding ball thread (or: ball thread groove). Such a ball thread is conventionally produced with the help of mounted points. The well-known procedure is time-consuming. Such a ball thread must have a high accuracy. A high accuracy can only be achieved if the manufactured thread can also be measured.

For measuring such a thread, stylus instruments are known from e.g. DE 199 47 001 A1, DE 10 2013 015 237 A1 or DE 10 2017 103 954 A1. Such a scanning measurement still has a higher accuracy than an optical measurement. In order to use a stylus instrument, the line to be measured must have certain characteristics, in particular, protruding areas of the surface may obstruct the alignment of the probe to the surface. A stylus instrument has a stylus finger with a probe head. This stylus finger is guided along a measurement line. A measurement line for an internal thread runs parallel to the thread axis in particular.

According to the state of the art, a cold forming tab is known to produce or rework a thread without cutting. With these tools, the thread is produced without cutting by means of forming the workpiece; so-called pressing lobes, also known as forming wedges or teeth, use pressure to cause cold deformation of the workpiece. Such a pressing lobe has flanks. The advantage of these tools is that the deformation of the surface and the associated hardening increases the hardness of the material in the region of the thread profile, thus creating a thread that is more wear-resistant than with chipping thread generation.

Known cold forming tabs, especially for internal thread production, comprise a shank and a working region. The shank is usually cylindrical and its end facing away from the workpiece is received and held in the chuck of a thread generating device. The working region, in particular the forming region, is located on the side of the cold forming tabs opposite the shank.

The forming region is provided with a spiral forming curve along the circumference, along which the pressing lobes are formed as elevations.

In the case of a cold forming tab known from DE 10 2012 100 734 A1, the pitch angle between two successive pressing lobes along the forming curve is the same for all pressing lobes. An imaginary straight connecting line between the tips of the pressing lobes along the forming curve forms in a projection on a surface perpendicular to the tool axis, apart from radial deviations, essentially a regular n-corned shape (polygon), where n pressing lobes are arranged per revolution of the forming curve around the tool axis. Every $n^{th}$ pressing lobe is arranged along a straight line parallel to the tool axis. These pressing lobes arranged along a straight line form a so-called pressing ridge. Furthermore, a cold forming tab is also known from DE 10 2012 100 734 A1.

With known thread formers, the pressing lobes have a profile which is determined perpendicular to a forming curve. A pressing lobe has a triangular, oval or cylindrical profile, especially in an upper region of the pressing lobe. Such a profile is perpendicular to the course of the forming curve. A section perpendicular to the forming curve is further referred to as a normal section. In the case of forming curves with a thread pitch, this means that the profile in normal section is tilted by the pitch angle $\alpha$ towards a surface that includes an axis of rotation of the thread cutter, the axial section. The plane containing the axis of rotation (axis section plane) is an r-z plane in a cylindrical coordinate system. The helix angle $\alpha$ lies in the $\theta$ z-plane, where $\theta$ is the angular coordinate of the coordinate system. If $\alpha=0°$, the curve has no pitch, but is a rotation perpendicular to the axis of rotation. $\alpha=90°$ corresponds to the direction of the axis of rotation.

Such a profile cannot be measured with sufficient accuracy with a known stylus instrument. In particular, the profile along the pressing lobes cannot be measured with sufficient accuracy with known, especially polygonally formed, thread grooves.

BRIEF SUMMARY OF THE INVENTION

One object of the invention is to provide a tool for the chipless production or reworking of a thread, which has a higher accuracy. A further object of the invention is to specify a method for producing a thread which can be measured more accurately with a stylus and to specify a method for producing a thread tool for producing such a thread.

With regard to the tool, the object is solved by a tool in accordance with the invention for the non-cutting production or finishing of a thread, in particular a ball thread, in or on a workpiece, in particular a cold forming tab or thread former, comprising at least one shaping region which can be rotated or rotates about a tool axis for the non-cutting production or finishing of the thread, in particular an internal thread. The shaping region has several pressing lobes projecting or protruding radially outwards away from the tool axis for producing or finishing the thread by pressing the pressing lobes into the surface of the workpiece. The pressing lobes are arranged in succession along a forming curve that essentially spirals around the tool axis. The slope of the forming curve corresponds essentially to the slope of the thread to be produced or reworked, wherein the forming curve has a helix angle $\alpha$. In accordance with the invention, a profile of at least one pressing lobe is designed in such a way that a thread produced in an axial section containing the tool axis is at least in sections round arched or ogival. A section that includes the axis of rotation of the thread cutter is the axial section. In the case of forming curves with a thread pitch, this means that the profile in normal section is tilted by the pitch angle $\alpha$ towards a surface that includes an axis of rotation of the thread cutter, the axial section. Preferably, the profiles of several pressing lobes or all pressing lobes are designed in this way. Due to the round or ogival shape, the surface in the axis section can be reached better with the probe head and the measuring accuracy is increased.

By round arched is understood in particular cylindrical, oval or convex with variable radius. By ogival is understood in particular a Gothic arch with uniform or variable radius. The tip of the ogival arch may be rounded. In a configuration, a variable radius can be a profile that has different sections with different radii, for example two to five different radii, and which has, in particular, transition regions in between, so that the curvature changes from a first radius to a second radius.

In an embodiment, a profile of at least a first pressing lobe is at least in sections, in particular completely, round arched or ogival in an axial section containing the tool axis. In particular, the radially outer region of a first pressing lobe, preferably a region containing a pressing lobe tip, has a round or ogival profile. In particular, the profile is one of: round arched, ogival, ogival with rounded tip, ogival with a first radius in the region of the tip and a second radius in the region of the flanks, ogival with extended legs. Two adjacent pressing lobes in axial section may be separated by a groove. Such a groove can be particularly flat or concave in axial section.

In further embodiment, the tool comprises in particular two or three or four or five or six or more pressing lobes and/or the pressing lobes are arranged in at least two pressing lobes. Such a pressing ridge is formed in the sense of this invention by a plurality of pressing lobes. This is in particular a straight pressing ridge in which every nth pressing lobe is arranged along a straight line parallel to the tool axis, i.e. at an angle of 360°. In particular, the first pressing lobes are arranged in a pressing ridge. A pressing ridge with several first pressing lobes, especially with exclusively first pressing lobes in the shaping region, is a first pressing ridge. Thus the first spindles have a round or ogival profile in the axial section, especially in a region containing the tip of the spindles. In this configuration, the profile of the tool along the tool axis, especially along the pressing lobe tips, can be measured particularly well with a stylus instrument.

By geometric conversion, the shape of the thread to be produced can then be precisely calculated, or the corresponding profile in the axial section can be calculated from the shape of the thread to be produced and the required profile in the normal section.

Optionally, one of the pressing ridges along the forming curve is longer than the other pressing ridges, wherein in particular the longer pressing ridge, a second pressing ridge, in particular the length of a 1.5-2.5 times swept angle θ, is longer than the shorter, in particular first pressing ridges. In an embodiment, the longer pressing ridge thus corresponds essentially to two adjacent pressing ridges without an intermediate lubrication groove.

In particular, the longer second pressing ridge can be a pressing ridge with several second pressing lobes, especially with exclusively second pressing lobes in the shaping region. In particular, the tool comprises exactly one second pressing ridge and several first pressing ridges. The first and second pressing ridges should ideally have a similar or identical profile.

In an embodiment, the tool has at least one, and in particular several, cooling channels, each of which has an outlet opening in a shaft-side section of the shaping region.

In further embodiment, at least some of the pressing lobes, in particular the first and/or second pressing lobes, have an initial forming region and/or a free surface region.

In the initial forming region the height of the pressing lobe increases in radial direction, in the free surface region the height of the pressing lobe decreases in radial direction, so that a clearance angle exists here. The initial forming region lies in the direction of rotation along the forming curve in front of the pressing lobe tip. The clearance region lies behind pressing lobe tip in the direction of rotation.

The initial forming region and/or free surface region can follow a polygon course. The initial forming region passes over into the region of the pressing lobe tip by means of a transition region and/or the region of the pressing lobe tip passes over into the free surface region by means of another transition region. In particular, the initial forming region can have a forming edge angle in the range of 5° to 17°, especially 12°.

In an embodiment, the shaping region comprises a forming region and a calibration region, the forming curve in the forming region having in particular one to three revolutions and the forming curve in the calibration region having in particular two to twenty, preferably five to ten revolutions. In a further configuration, the calibration region can be conical so that the diameter of the calibration region increases towards the shaft. The taper ratio can be 1:1000, for example.

A thread can be produced with the method according to the invention for the non-cutting production or reworking of a thread, in particular a ball thread, preferably an internal thread, with a tool according to the invention, the thread having a thread pitch with a helix angle α and being suitable for scanning with a stylus instrument known per se. The advantage of the procedure according to the invention is that the threads have a high accuracy and can be produced with less time expenditure.

In an embodiment, a thread produced in a section containing the tool axis is at least in sections round or ogival, in particular cylindrical.

The thread is first pre-cut and then shaped.

The process according to the invention for the manufacture of a tool according to the invention is suitable for the chipless production or reworking of a thread, in particular a ball thread, in or on a workpiece, in particular a cold forming tab or thread former. The process comprises in particular the following steps: Providing a blank and milling out or cutting the pressing lobes or providing a shank and building up the pressing lobes with an additive process, in particular 3-D printing.

BRIEF DESCRIPTION OF THE DRAWINGS

The invention is also explained in more detail below with regard to further features and advantages by means of the description of embodiments and with reference to the enclosed drawings. Thereby showing:

FIG. 1 a view of an embodiment of a thread tap according to the invention,

FIG. 2 another view of the execution example from FIG. 1 of the thread tap,

DETAILED DESCRIPTION OF THE PREFERRED EMBODIMENTS

Figure 3:
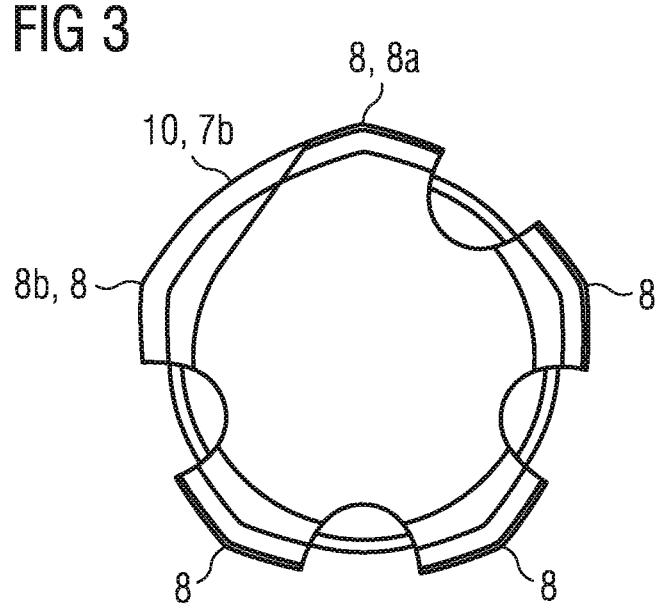
FIG. 3 a view of the execution example from FIG. 1 on a tip of the thread cutter, FIG. 4 the profile of a pressing lobe along the forming curve, FIG. 5 a thread profile FIG. 6 a superposition of a profile of a pressing lobe in axial and normal section FIG. 7 a, b, c different ogival profiles of a pressing lobe, and FIG. 8 a, b different ogival profiles of a pressing lobe.

The cold forming tab 1 in FIG. 1 has a shank 2 and a forming region 5. The shank is cylindrical at least in sections and has a square profile at an end facing away from forming region 5, which is suitable for mounting in a chuck of a thread generating device. The cold forming tab has a tool axis A, which is the axis of rotation.

The shaping region 5 is divided into a forming region 3 facing a tool tip and a calibrating region 4. In shaping region 5, pressing lobes 7 are arranged in pressing ridges 9, 10. The pressing ridges 9, 10 are straight pressing ridges. The pressing lobes 7 lie on a spiral forming curve 6, which has a helix angle α. In the calibration region 4, the pressing lobes 7 have a greater radial height than in the forming region 3. A lubrication groove 11 is arranged between two adjacent pressing ridges 9, 10. The pressing ridges 9, 10 and the lubrication grooves 11 run parallel to a tool axis A.

Adjacent pressing lobes 7 in a pressing ridge 9, 10 do not abut directly but are separated from each other by a groove 14, which is flat in the axial section in the embodiment shown. Here, the groove 14 runs parallel to the forming curve 6. A pressing lobe 7 has a profile 20 parallel to the tool axis, i.e. a profile in the axial section. This profile 20 is limited in the direction of the tool axis by a profile limiting curve 21a. Two profile boundary curves of adjacent pressing lobes 7 do not meet here, but each end at the groove 14. In a section perpendicular to the forming curve 6, i.e. normal section, the same pressing ridge has a different profile boundary curve 21b at an helix angle not equal to zero. In an alternative embodiment not shown, adjacent pressing lobes can also abut without a groove, or be separated by a concave groove tapering towards the shaft axis. In the first case, the respective profile boundary curves then end at the joint or at the transition to the concave groove.

As shown in FIG. 2 and especially FIG. 3, the pressing ridges 9, 10 have a different length. In the view of the tool tip in FIG. 3, the cold forming tab 1 has a polygonal shape, here with five corners. Each of the pressing ridges 9 has a polygon corner. The pressing ridges 9 with the pressing lobes 7a and 7c have a first length and each comprise exactly one polygon corner. These are first pressing ridges 9 with first pressing ridges 7a, 7c. The pressing ridge 10 with the pressing lobes 7b has a greater length and includes two polygon corners. It is a second pressing ridge 10 with second pressing lobes 7b. The region of the polygon corner of each pressing lobe forms a pressing lobe tip 8, which has a greater radial distance to the tool axis A than the other regions of the pressing lobe. The second press lobe 7b has press lobe tips 8a and 8b, with the press lobe tip 8a on the forming curve behind the press lobe tip 8b. The pressing lobe tips 8a and 8b can have different radial distances to the tool axis.

Figure 4:
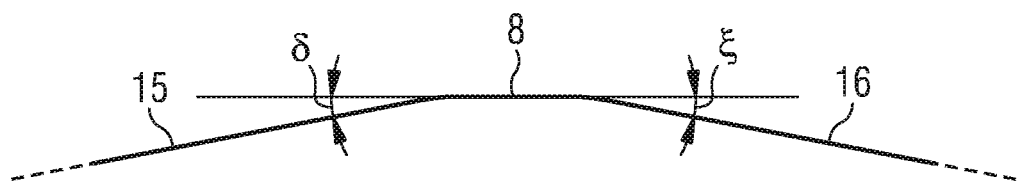

The shorter first pressing lobe 7a and/or the longer second pressing lobe 7b with a initial forming region 15 and a free surface region 16, as shown in FIG. 4, has in particular a forming edge angle δ. A transition region is formed towards the polygon corner. The apex of the pressing lobe 8 has a curved or smooth region along the forming curve 6 and in a plane tilted around a to the vertical plane, i.e. in the axial section, a cylindrical profile, thus here a round arch profile, and passes over a further transition region into a free surface region with a clearance angle ξ. In this example, the clearance angle ξ essentially corresponds to the clearance angle δ, especially the clearance angle±5°.

Figure 5:
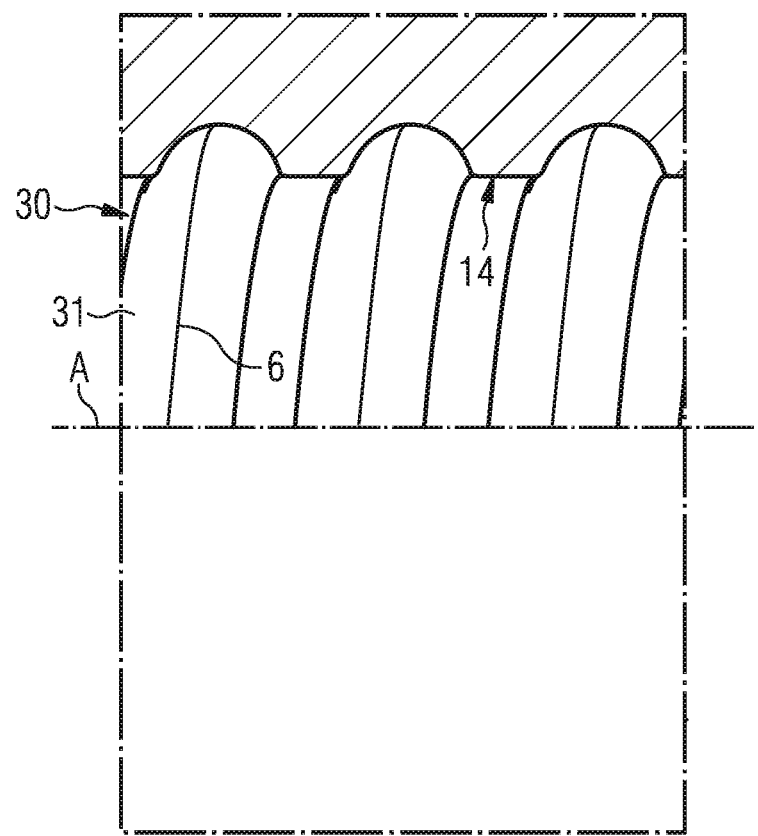

FIG. 5 shows a thread profile 30, with thread 31 winding along the forming curve 6. In the normal section N, i.e. in a view tilted by the pitch angle α to the axis section, the thread profile shown has a round arc-shaped profile, especially a cylindrical profile.

Figure 6:
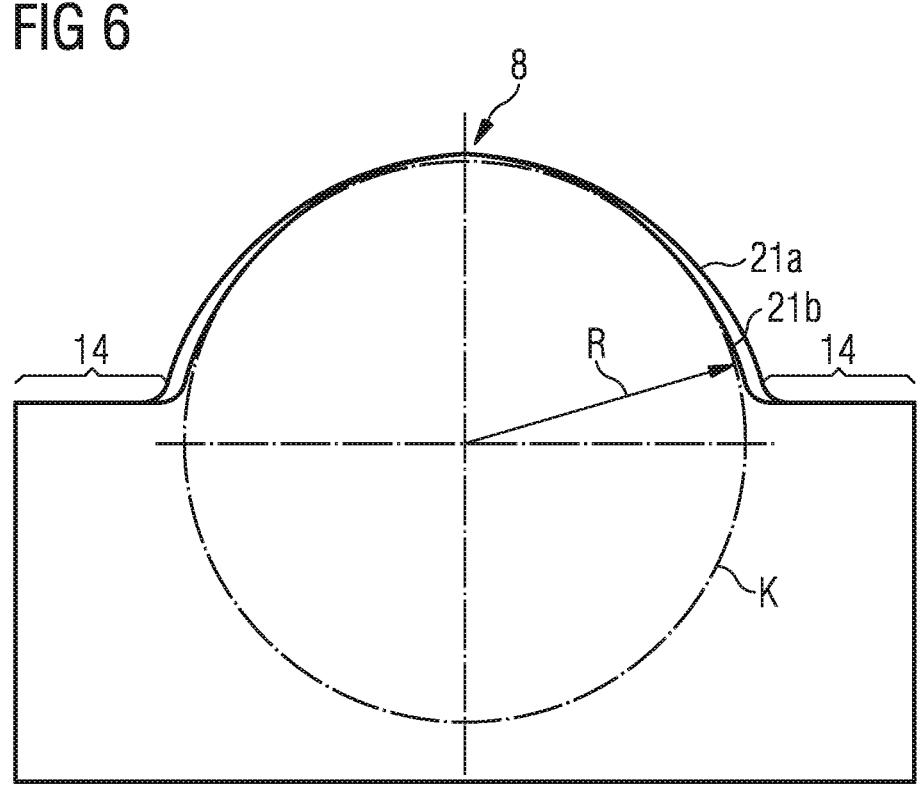
Figure 7A:
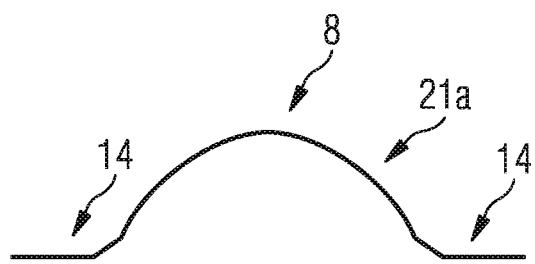
Figure 7B:
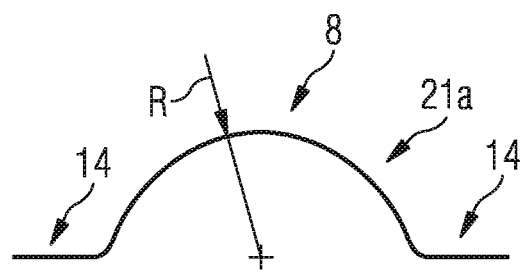
Figure 7C:
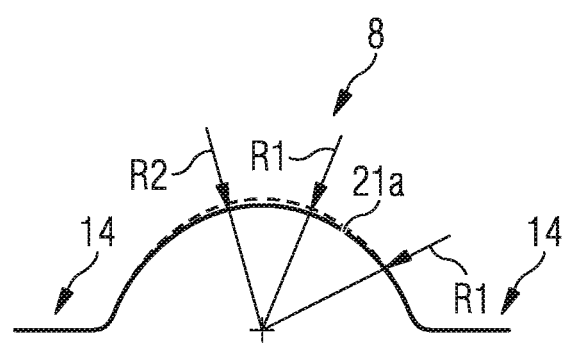

FIGS. 6 to 8 show further profiles of a pressing lobe, especially in the region of a pressing lobe tip, in normal cut or axial cut. FIG. 6 shows a second embodiment of a profile of a pressing lobe in an overlapping of normal section and axial section. The circular arc K serves only as a visual support and simplifies the recognition of the changing radius along the profile boundary curves 21a and 21b. Profile boundary curve 21a represents the profile boundary curve in the axis section, while profile boundary curve 21b represents the profile boundary curve in the normal section. Both profile boundary curves 21a, 21b are ogival. The two profile boundary curves 21a, 21b differ in a lower region facing the respective groove 14. FIG. 7a shows an ogival profile in axial section, while FIG. 7b shows an ogival profile in axial section with rounded tip. FIG. 7c shows a further ogival profile in axial section, in which, in deviation from the previously shown profiles, the radius in the region facing the respective groove 14 is a radius R1 and which merges into a radius R2 in the region of the tip of the ogival arch, where R1<R2.

Figure 8A:
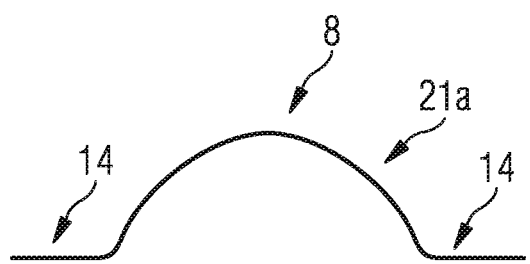
Figure 8B:
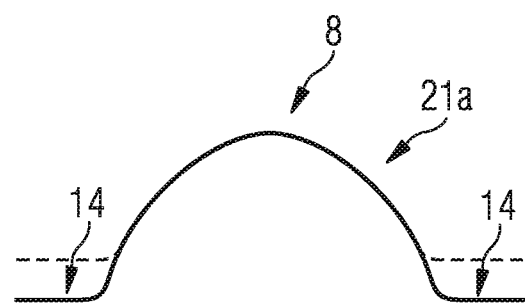

FIGS. 8a and 8b show a further embodiment of a pressing lobe profile, especially in the region of a pressing lobe tip. The two legs of the pointed arch have a uniform radius in FIG. 8a. In FIG. 8b, the radius of the legs increases in an region facing the groove 14, so that the legs are tangentially extended.

| | Reference character list |
|---|---|
| 1 | Tool |
| 2 | Shaft |
| 3 | forming region |
| 4 | Calibration region |
| 5 | shaping region |
| 6 | forming curve |
| 7, | Pressing lobes |
| 7a, 7c | first pressing lobe |
| 7b | second pressing lobe |
| 8 | Pressing lobe tip |
| 9 | first pressing ridge |
| 10 | second pressing ridge |
| 11 | Lubrication groove |
| 12 | Cooling channel outlet |
| 14 | Groove |
| 15 | initial forming region |
| 16 | Free surface region |
| 20 | Profile |
| 21a | first profile boundary curve |
| 21b | Second profile boundary curve |
| 30 | Thread profile |
| 31 | Thread |
| A | Tool axis |
| N | Normal cutting plane |
| α | helix angle |
| δ | forming edge angle |
| ξ | clearance angle |
| θ | angular coordinate of the coordinate system |
| K | circular arc |

We claim:
1. A tool for the chipless production or finishing of a thread, in or on a workpiece, comprising:
   at least one shaping region which can be rotated about a tool axis (A) for chipless production or finishing of the thread,
   wherein:
   the at least one shaping region comprises a plurality of pressing lobes projecting or protruding radially out- wardly from the tool axis (A) for producing or finishing the thread by pressing the plurality of pressing lobes into a surface of the workpiece, the pressing lobes are successively arranged along a forming curve which substantially spirals around the tool axis (A), a pitch of the forming curve corresponds to a pitch of the thread to be produced or reworked, the forming curve has a helix angle (a); and a profile of at least one pressing lobe of the plurality of pressing lobes is designed in such a way that a thread produced in an axial section containing the tool axis (A) is at least in sections round-arched or ogival, the tool comprises two or three or four or five or six or more pressing lobes and/or the pressing lobes are arranged in at least two pressing ridges, one of the at least two pressing ridges is a first pressing ridge and another is a second pressing ridge, the second pressing ridge is longer along the forming curve than the first pressing ridge, and the second pressing ridge has a length of a 1.5-2.5 times swept angle θ than the first pressing ridge.

2. The tool as recited in claim 1, wherein:
the profile of the at least one pressing lobe is at least in sections round-arched or ogival, in an axial section containing the tool axis (A); and
the profile of the at least one pressing lobe is round-arched or ogival, in an axial section containing the tool axis (A) in a region of a pressing lobe tip.

3. The tool as recited in claim 2, wherein:
the profile of at least one of the of the plurality of pressing lobes is selected from one of the following profiles: round, ogival, ogival with rounded tip, ogival with a first radius in the region of the pressing lobe tip and a second radius in a region of a flanks, ogival with extended legs.

4. The tool as recited in claim 1, wherein the tool has cooling channels, each of the cooling channels having an outlet opening in a shaft-side section of the at least one shaping region.

5. The tool as recited in claim 1, wherein:
at least some of the plurality of pressing lobes have an initial forming region and/or have a free surface region.

6. The tool as recited in claim 5, wherein:
the initial forming region passes into a region of the pressing lobe tip through a transition region; and/or
the region of the pressing lobe tip passes by a further transition region to the free surface region.

7. The tool as recited in claim 5, wherein:
the initial forming region and/or free surface region has a polygonal shape.

8. The tool as recited in claim 1, wherein:
the at least one shaping region comprises a forming region and a calibrating region;
the forming curve in the forming region has one to three revolutions; and
the forming curve in the calibrating region has two to twenty revolutions, and the calibrating region is conical.

9. The tool as recited in claim 1, wherein:
tool for the chipless production or finishing of a thread in or on the workpiece that is a cold forming tap or thread former, and
the at least one shaping region, which can be rotated about a tool axis (A), is configured for chipless production or finishing of the internal thread.

10. The tool as recited in claim 1, wherein:
the shaping region comprises a forming region and a calibrating region;
the forming curve in the forming region has one to three revolutions; and
the forming curve in the calibrating region has five to ten revolutions, and the calibrating region is conical.

11. A method for the non-cutting production or reworking of a thread, comprising:
using a tool for the chipless production or finishing of a thread, in or on a workpiece, comprising:
rotating at least one shaping region about a tool axis (A) for the chipless production or finishing of the thread, wherein the at least one shaping region comprises a plurality of pressing lobes projecting or protruding radially outwardly from the tool axis (A) for producing or finishing the thread by pressing the plurality of pressing lobes into a surface of the workpiece;
arranging the pressing lobes successively along a forming curve which substantially spirals around the tool axis (A),
wherein a pitch of the forming curve corresponds to a pitch of the thread to be produced or reworked, and the forming curve has a helix angle (α);
designing a profile of at least one pressing lobe of the plurality of pressing lobes such that a thread produced in an axial section containing the tool axis (A) is at least in sections round-arched or ogival; and
scanning the thread with a stylus instrument, wherein the thread has a thread pitch with the helix angle (α), wherein
the tool comprises two or three or four or five or six or more pressing lobes and/or the pressing lobes are arranged in at least two pressing ridges,
one of the at least two pressing ridges is a first pressing ridge and another is a second pressing ridge,
the second pressing ridge is longer along the forming curve than the first pressing ridge, and
the second pressing ridge has a length of a 1.5-2.5 times swept angle θ than the first pressing ridge.

12. The method as recited in claim 11, wherein a thread produced in a cut containing the tool axis is at least in sections round or ogival in shape.

13. The method as recited in claim 11, wherein the thread is pre-cut and then re-formed.

14. The method as recited in claim 11, further comprising:
providing a blank; and
milling or cutting the plurality of pressing lobes.

15. The method as recited in claim 11, further comprising:
providing a shaft; and
building up the plurality of pressing lobes with an additive process.

16. A method for the non-cutting production or reworking of a thread, comprising:
using a tool for the chipless production or finishing of a thread in or on a workpiece, comprising:
rotating at least one shaping region about a tool axis (A) for the chipless production or finishing of the thread, wherein
the shaping region comprises a plurality of pressing lobes projecting or protruding radially outwardly from the tool axis (A) for producing or finishing the thread by pressing the plurality of pressing lobes into a surface of the workpiece;
the pressing lobes being arranged successively along a forming curve which substantially spirals around the tool axis (A), wherein a pitch of the forming curve corresponds to a pitch of the thread to be produced or reworked, and the forming curve has a helix angle (a);

producing a thread that is at least in sections round-arched or ogival in an axial section containing the tool axis (A); and scanning the thread with a stylus instrument, wherein the thread has a thread pitch with the helix angle (α) wherein the tool comprises two or three or four or five or six or more pressing lobes and/or the pressing lobes are arranged in at least two pressing ridges, one of the at least two pressing ridges is a first pressing ridge and another is a second pressing ridge, the second pressing ridge is longer along the forming curve than the first pressing ridge, and the second pressing ridge has a length of a 1.5-2.5 times swept angle θ than the first pressing ridge.

17. The method as recited in claim 16, wherein
the reworking of the thread is a reworking of a ball thread that is an internal thread, the step of using the tool for the chipless production or finishing of the thread includes using the tool for the chipless production or finishing of the ball thread in or on the workpiece that is a cold forming tap or thread former, comprising:

rotating the at least one shaping region about the tool axis (A) for the chipless production or finishing of the internal thread.

18. The method as recited in claim 16, wherein
the reworking of the thread is a reworking of a ball thread that is an internal thread, the step of using the tool for the chipless production or finishing of the thread includes using the tool for the chipless production or finishing of the ball thread in or on the workpiece that is a cold forming tap or thread former, comprising:

rotating the at least one shaping region about the tool axis (A) for the chipless production or finishing of the internal thread.

* * * * *